March 31, 1959 E. J. HAUGE 2,880,360
COLOR TELEVISION RECEIVER
Filed Nov. 30, 1954

INVENTOR.
Edward J. Hauge
BY
Mueller and Aichele Attys.

United States Patent Office 2,880,360

Patented Mar. 31, 1959

2,880,360

COLOR TELEVISION RECEIVER

Edward J. Hauge, Chicago, Ill., assignor to Motorola, Inc., Chicago, Ill., a corporation of Illinois Application November 30, 1954, Serial No. 472,033

16 Claims. (Cl. 315—13)

The present invention relates to color television receivers and more particularly to a system for controlling the convergence of the electron beams in a tri-beam cathode-ray tube used in such receivers for reproducing received color images.

Most present day color television receivers utilize a cathode-ray reproducing tube wherein a plurality of beams are generated from spaced sources at one end of the tube to scan the viewing screen at the other end to produce distinct color images thereon which appear to the human eye as an integrated color picture. In such tubes it is necessary to converge the different beams which originate from the spaced sources at a certain plane within the tube so that they are in proper registry to produce the distinct color images. One such color tube employs a multi-colored sensitive surface having a plurality of separate phosphor dots, each of which emits light of a different primary color when impinged by an electron beam. These phosphor dots are closely arranged in symmetrical groups, and each group is aligned with a corresponding opening of an apertured disc, known as a shadow mask, which is between the group of dots and the electron beam sources. The plurality of electron beams, each modulated with the color information for a particular set of phosphor dots, is scanned across the mask so that the individual beams strike the corresponding phosphor dots. Each group of dots then comprises an element of the completed color picture.

It is common to employ three electron beams emanating from separated sources within the cathode ray tube, with all of such beams being deflected by a common horizontal and vertical deflection system in order to scan the shadow mask. It is then necessary that the three beams be converged at each opening of the shadow mask in order that they may pass therethrough to impinge upon the proper phosphor dots, and that such convergence be maintained throughout each scanning cycle of the beams. However, since the electron beams are scanned through rather wide angles and across a shadow mask all parts of which are not equidistant from the sources of the beams, the amount of convergence applied to the beams must be varied during the scanning of the beam across the shadow mask, that is, a dynamic convergence control must be used. It has been found that parabolic wave forms recurring at the horizontal and vertical deflection frequencies may be used to produce a control effect which properly converges the beams in the plane of the shadow mask, and keeps them so converged, as they are scanned across the shadow mask in both vertical and horizontal directions.

It is, accordingly, an object of the present invention to provide an improved convergence circuit for a color television receiver and which provides the control effect described above.

Another object of the invention is to provide such an improved convergence control circuit for properly converging a plurality of electron beams throughout the various scanned positions thereof which is inherently simple in its construction and which lends itself to relatively simple adjustment.

A feature of the invention is the provision of an improved convergence control circuit which provides a desired dynamic control effect by the simple expedient of a series-resonant network coupled to the horizontal sweep system of a color television receiver with a dynamic deflection coil coupled across an inductor element of the tuned circuit for providing a control signal dynamically to converge each of a plurality of electron beams in a color television cathode-ray image reproducer.

Another feature is the provision of such an improved control circuit which includes a dynamic deflection coil series-connected between a supply of a control signal at the frequency of the vertical deflection signal in a television receiver and a network supplying a control signal at the frequency of the horizontal deflection signal in the receiver so that both vertical and horizontal dynamic convergence may be achieved with a minimum of components and associated circuitry.

Further objects, features and the attending advantages of the invention will be apparent upon consideration of the following description when taken in conjunction with the accompanying drawing in which.

Figures 1, 2, 3:
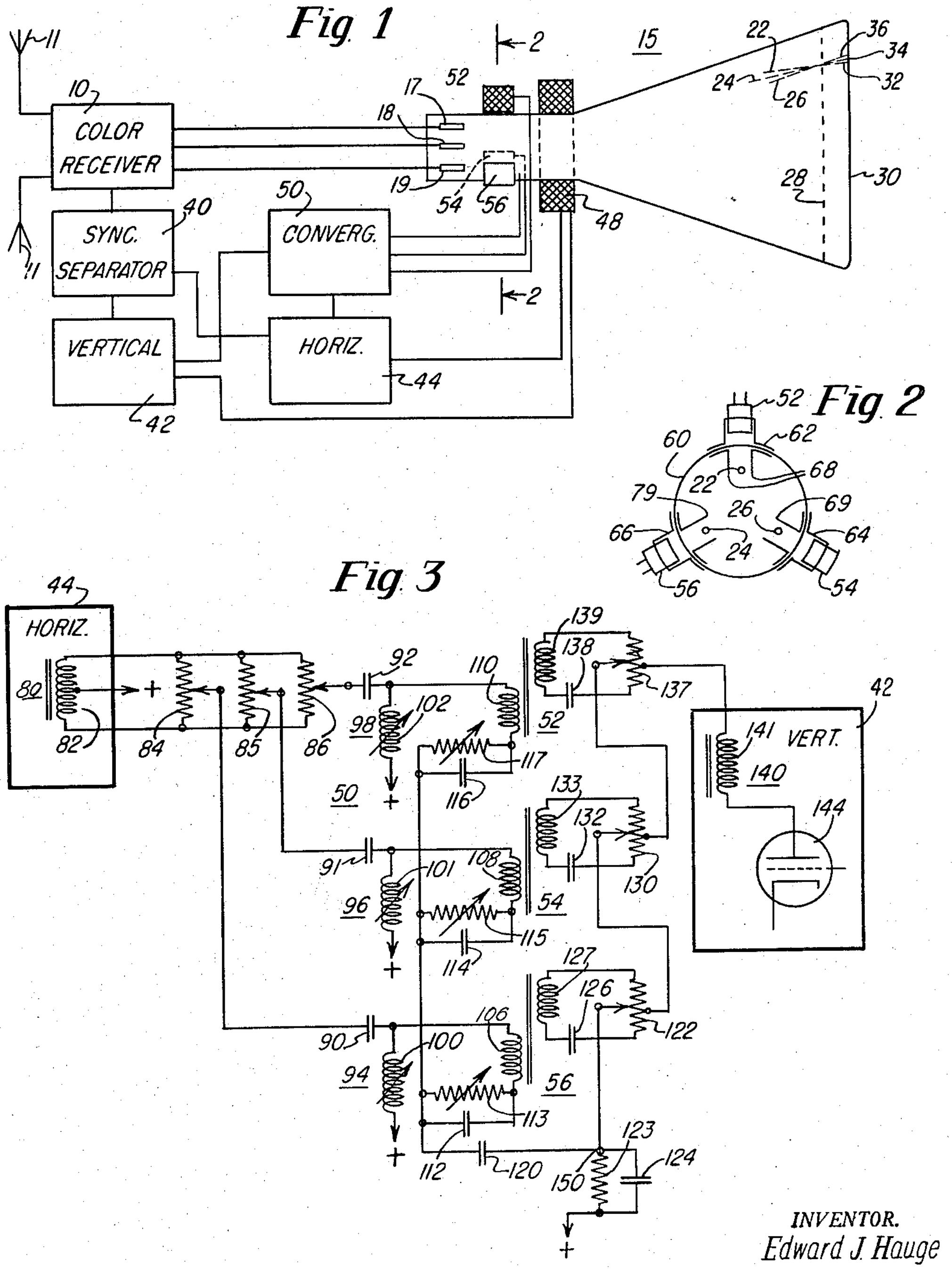
Fig. 1 is a block diagram of a color television receiver utilizing the present invention.
Fig. 2 is a cross-sectional view, taken along the lines 2—2, of the cathode-ray tube shown in Fig. 1.
Fig. 3 is a schematic diagram of a convergence system constructed in accordance with the invention.

According to the invention, the dynamic convergence system includes a plurality of series-resonant networks coupled to the horizontal sweep system of a television receiver for developing a sine-wave varying at the frequency of the horizontal deflection signal used in the receiver. The convergence coils, one for each electron beam, of the image reproducer are supported in proximity to the paths of the respective electron beams, and one side of each of such coils is connected to an inductor of its corresponding resonant network while the other side of each convergence coil is coupled to a source of convergence signals varying at the vertical scanning frequency of the electron beams so that each beam is converged by signals related to the horizontal and vertical deflection frequencies of the color television receiver.

Referring now to the drawing, Fig. 1 shows a color television receiver in diagrammatical form. The receiver 10 is coupled to antenna 11 and provides signals for the multi-beam cathode-ray image reproducing tube 15. Color signals corresponding to three primary colors are applied to the electron guns 17, 18 and 19 which produce electron beams 22, 24 and 26 only partially shown and shown out of proportion for clarity. An apertured shadow mask 28 is disposed near the cathode-ray tube screen 30, and in the plane of this mask the beams 22, 24 and 26 are converged to pass through the apertures therein and impinge upon groups of phosphor dots such as the group 32, 34 and 36.

Also coupled to the television receiver apparatus 10 is a synchronizing signal separator circuit 40 which, together with a vertical scanning circuit 42 and a horizontal scanning circuit 44, comprise the sweep system of the receiver. The circuits 42 and 44 are coupled to the deflection yoke 48 which is disposed on the neck of the cathode-ray tube 15 so that deflection signals applied to this yoke by the horizontal and vertical circuits produce suitable scanning of the electron beams in vertical and horizontal directions across the shadow mask 28 and screen 30. However, it may be seen that as the electron beams are scanned across the shadow mask so that they may impinge upon different groups of phosphor dots to reproduce a complete picture, the edges of the shadow mask will be at different distances from the electron guns 17—19 as compared with the center of the mask. Therefore, if the beams are to be maintained converged in the plane of the mask so as to pass through the various apertures therein and impinge upon the proper phosphor dots, the point of convergence or focus must vary continually during each scanning cycle. Accordingly, a convergence control circuit 50 is coupled to the horizontal and vertical deflection circuits 44 and 42, respectively, in order to develop proper convergence signals synchronized with the horizontal and vertical deflection signals which convergence signals are applied to the dynamic convergence coils 52, 54 and 56 of the image reproducer 15.

Fig. 2 illustrates a cross-sectional view of the neck 60 of the cathode-ray image reproducer tube 15 and the placement of the convergence coils 52, 54 and 56 about the neck. These coils are disposed upon suitable cores 62, 64 and 66 which are positioned to produce a magnetic field across the internal pole pieces 68, 69 and 70. These pole pieces are supported respectively adjacent the paths of the various electron beams 22, 24 and 26 so that each beam passes between a corresponding pair of pole pieces, as shown.

As is well known, current flow in any one of the convergence coils induces a magnetic flux field in the associated cores and in the internal pole pieces which field will extend between the spaced portions of these pole pieces to deflect the electron beam passing therebetween at right angles to the direction of the magnetic field and at right angles to the direction of the beam. In accordance with the present invention, suitable currents are produced for these convergence coils 52, 54 and 56 to produce a desired deflection or bending of each of the electron beams so as to maintain the beams in convergence at the plane of the shadow mask throughout each deflection cycle thereof. The invention, in effect, provides a magnetic lens having a focal length which varies with the scanned position of an electron beam for each of the three beams of a tri-beam color television tube so as to maintain the beams converged in a selected plane at all times.

Fig. 3 is a schematic diagram of the convergence control circuit 50 of the present invention for producing signals to be applied to the convergence coils 52, 54 and 56. The usual horizontal output transformer 80 of the horizontal sweep system 44 includes a winding portion 82 across which is coupled potentiometers 84, 85 and 86 in shunt relation, each with a variable arm. A center tap of the winding 82 is coupled to a source of positive potential which comprises a reference point for the convergence system. The variable arms of resistors 84—86 are respectively coupled to capacitors 90, 91 and 92 of respective series-resonant circuits 94, 96 and 98. Capacitors 90—92 are coupled through respective inductors 100, 101 and 102 to the positive potential source with the capacitors and inductors forming the respective series-resonant circuits. The windings 106, 108 and 110 of respective convergence coils 56, 54 and 52 are respectively coupled to the junctions of the capacitors and inductors in the tuned circuits 94, 96 and 98. The other side of windings 106, 108 and 110 are coupled to a blocking capacitor 120 through respective resistance-capacity parallel networks including, a capacitor 112 and a variable resistor 113; a capacitor 114 and a variable resistor 115; and a capacitor 116 and a variable resistor 117. The other side of blocking capacitor 120 is connected to a variable arm on a resistor 122 and to the positive potential source through a parallel combination of a resistor 123 and capacitor 124. Variable resistor 122 is series-connected with a blocking capacitor 126 across a further winding 127 of the convergence coil 56. A fixed tap on resistor 122 is connected to a variable arm on a resistor 130, resistor 130 being series-connected with a blocking capacitor 132 across a further winding 133 of the convergence coil 54. A fixed tap on resistor 130 is connected to a variable arm of resistor 137, which resistor is series-connected with blocking capacitor 138 across a further winding 139 of convergence coil 52. A fixed tap on resistor 137 is connected to the plate of the vertical output amplifier valve 144 through a winding 141 on the vertical output transformer in the vertical deflection system 42.

As is customary in the vertical field scanning circuit, the current in winding 141 of transformer 140 is sawtooth in shape and of a frequency of the order of 60 cycles in present day receivers. This current of sawtooth wave form flows through portions of resistors 137, 130 and 122 and through capacitor 124, which elements form an integrating network which produces a potential of parabolic wave form at point 150. Such a parabolic wave form at the vertical sweep frequency is suitable for dynamically converging the cathode-ray beams throughout the vertical deflection cycles, and this signal is applied through the blocking capacitor 120 and the respective parallel resistor-capacitor combinations 112—113, 114—115, 116—117 associated with the windings 106, 108 and 110 to these windings. The resistors 113, 115 and 117 are not by-passed to any appreciable extent by capacitors 112, 114 and 116 at the vertical frequency so that these resistors determine the current flow of the vertical dynamic convergence signals and may be adjusted to provide amplitude variations in the level of the signal applied to the respective convergence coil windings.

The resistor 123 provides a direct-current path for the positive potential to the plate of amplifier valve 144. The impedance of inductors 100—102 is comparatively low at the vertical scanning frequencies and these inductors serve as a return connection to the positive source for each of the windings 106, 108 and 110, so that the windings are effectively coupled across capacitor 124 for the vertical convergence signal.

The vertical sawtooth wave form is also applied by means of resistors 122, 130 and 137 respectively to windings 127, 133 and 139 of the convergence coils. The field produced by these windings in response to the sawtooth potentials developed thereacross is used to tilt the parabolic wave form in the respective associated dynamic convergence windings 106, 108 and 110. The direction and amount of tilting may be regulated by adjustment of the arms of resistors 122, 130 and 137 on either side of the fixed taps so that optimum adjustment of the vertical convergence circuit may be made. Capacitors 126, 132 and 138 serve to block the direct-current from the associated tilt windings.

Considering now the horizontal convergence signal, pulses occurring at the horizontal frequency of 15,750 c.p.s. will be induced in winding 82 of he horizontal output transformer 80, and these pulses are applied through portions of resistors 84—86 to the series-resonant circuits 94, 96 and 98 to produce sine-wave signals across these circuits. Since winding 82 is center tapped adjustment of the arms of resistors 84—86 permits reversing the polarity of the pulses and adjustment of the amplitude of the pulses exciting the various resonant circuits. Furthermore, the inductors 100—102 in the respective resonant circuits may be made variable to change slightly the phase of the sine-wave developed in each of these resonant circuits with respect to the exciting signal at the horizontal frequency. The sine-waves thus developed across each of the inductors 100—102 are respectively applied to the convergence windings 106, 108 and 110. These convergence windings may be of the order of 10 times the impedance of the corresponding inductors 100, 101, 102 in the associated resonant circuits so that they will have a minimum influence on the resonant networks.

Capacitors 112, 114, 116, 120, and 124 provide a low impedance path to the positive source for the sine waves so that inductors 100, 101, 102 and corresponding dynamic convergence windings 106, 108, 110 are effectively in parallel at the frequency of the sine waves. Therefore, the sine wave developed in each of the inductors will be applied to the associated convergence coils. Through proper adjustment of the phases and amplitudes of these sine waves by the previously described controls, such sine waves may be made to provide proper control for converging the electron beams throughout each of the horizontal deflection cycles.

There has been no description of static convergence means, i.e., apparatus to converge the beams in a given position in plane of the shadow mask without deflecting the beams, but it is understood that some suitable means may be incorporated with the deflection coils for such purpose.

It is apparent that the convergence control system thus described is of simple and inexpensive construction, and includes convenient amplitude and phase controls so that the convergence of the beams may be adjusted for optimum results by simply performed operations. Furthermore, the inductors 100—102 in the resonant circuits may be of the high Q type (high quality factor) so that the signal applied to the convergence coils will be of increased amplitude but yet these inductors are separate from the convergence coils and may be conveniently positioned in the physical structure and made adjustable for varying the phase of a converging signal.

By impressing a horizontal convergence signal on one end of a convergence coil and the vertical convergence signals on the other end of the convergence coil, it is possible to provide highly satisfactory results without the need of isolating elements, such as chokes, for preventing intercoupling between the horizontal and vertical systems. The described system, therefore, may furnish the necessary convergence signals for a tri-beam color television tube by means of a highly satisfactory circuit.

I claim:

1. In a television receiver including a cathode ray image reproducing tube having means for developing a plurality of cathode ray beams therein and a sweep system for supplying to the cathode ray tube a deflection signal of a selected frequency for scanning the cathode ray beams, a circuit for developing a convergence control signal for dynamically controlling the convergence of a cathode ray beam with respect to another beam throughout each cycle of the deflection signal, said circuit including in combination a series connected network of capacitor and inductor elements resonant substantially at the selected frequency, means coupling said capacitor element to the sweep system so that said network may develop substantially a sine wave control signal, a dynamic convergence coil adapted to be disposed adjacent the cathode ray tube, and means directly coupling said convergence coil to the juncture of said capacitor and inductor elements so that said control signal is applied to said dynamic convergence coil for converging a cathode ray beam with respect to another beam.

2. In a television receiver including a cathode ray image reproducing tube having means for developing a plurality of cathode ray beams therein and a sweep system for supplying to the cathode ray tube a deflection signal of a selected frequency for scanning the cathode ray beams, a circuit for developing a convergence control signal for dynamically controlling the convergence of a cathode ray beam with respect to another beam throughout each cycle of the deflection signal, said circuit including in combination a series-resonant network including a capacitor element and an inductor element of selected impedance, means coupling said resonant network to the sweep system, said resonant network being tuned substantially to the selected frequency and having a quality factor so that the same develops a control signal of the selected frequency and increased amplitude, and a convergence coil directly connected to said inductor element of said resonant network, said convergence coil having an impedance substantially greater than said selected impedance for minimizing the influence on said resonant network and said convergence coil being adapted to be positioned adjacent the cathode ray tube and responsive to the control signal for controlling the convergence of a cathode ray beam with respect to another beam.

3. In a television receiver including a cathode ray image reproducing tube having means for developing a plurality of cathode ray beams therein and a scanning system including a line sweep system for deflecting the beams at a selected line frequency and a field sweep system for deflecting the beams at a selected field frequency, a control circuit for dynamically controlling the convergence of the cathode ray beams including in combination, convergence coil means disposed adjacent the cathode ray tube, said convergence coil means having a pair of terminals for electrical connection thereto, a series-resonant circuit coupled to said line sweep system for developing a sine wave substantially at the line frequency, and including capacitor and inductor means, means coupling one terminal of said convergence coil means directly to said inductor means for applying said sine wave thereto, circuit means coupled to said field sweep system for developing a control signal bearing a selected relation to the field frequency, and means coupling said circuit means to the other terminal of said convergence coil means for applying said control signal thereto.

4. In a television receiver including a cathode ray image reproducing tube having means for developing a plurality of cathode ray beams therein and a scanning system including a line sweep system for deflecting the beams at a line frequency and a field sweep system for deflecting the beams at a field frequency, a control circuit for dynamically controlling the convergence of the cathode ray beams including in combination, convergence coil means disposed adjacent the cathode ray tube and having a pair of terminals for electrical connection thereto, a series resonant circuit including a capacitor coupled to said line sweep system and an inductor coupled between a reference point and a junction point with said capacitor, said series resonant circuit being adapted to develop a first control signal substantially at the line frequency, means directly coupling said junction point to one terminal of said convergence coil means for applying said first control signal thereto, circuit means coupled to said field sweep system and said reference point for developing a second control signal bearing a selected relation to the field frequency and including means coupled to the other terminal of said convergence coil means for applying said second control signal thereto, said circuit means presenting a low impedance path to said reference point at the line frequency so that said inductor and said convergence coil means are effectively in parallel relation at the line frequency and said inductor presenting a low impedance path to said reference point at the field frequency to reduce coupling of the field sweep system into the line sweep system.

5. In a television receiver including a cathode ray image reproducing tube having means for developing a plurality of cathode ray beams therein, a sweep system including a transformer for supplying to the cathode ray tube a line deflection signal of a selected frequency for scanning the cathode ray beams and a field sweep system for scanning the beams at a field frequency, a circuit for developing a convergence control signal for dynamically controlling the convergence of the cathode ray beams throughout each cycle of the deflection signal, said circuit including in combination a series-resonant network tuned substantially to the selected frequency, and including a capacitor element and a variable inductor element, a center tapped winding on the transformer adapted to provide a signal of the selected frequency, variable resistor means coupled across said center tapped winding and to said capacitor element for applying said signal to said network in selected polarity with respect to the center tap of said winding so that said network develops a first control signal, a source of a second control signal substantially of the field frequency and convergence coil means associated with the cathode ray tube and coupled to said inductor element of said resonant network and to said source for controlling the convergence of a beam with respect to another by the first and second control signals.

6. In a television receiver including a cathode ray image reproducing tube having means for developing a plurality of cathode beams and scanning means including a line sweep system for deflecting the beams at a selected line frequency and a field sweep system for deflecting the beams at a selected field frequency, a control circuit for dynamically controlling the convergence of the cathode ray beams including in combination, convergence coil means disposed adjacent the cathode ray tube, a first source of signals at the line frequency having a relatively low impedance return path for signals at the field frequency, a second source of signals at the field frequency having a relatively low impedance return path for signals at the line frequency, and means coupling said convergence coil means to said first and second sources for applying signals of line frequency from said first source to said convergence coil means through said second source and for applying signals of field frequency from said second source to said convergence coil means through said first source.

7. In a television receiver including a cathode ray image reproducing tube having means for developing a plurality of cathode ray beams and scanning means including a line sweep system for deflecting the beams at a selected line frequency and a field sweep system for deflecting the beams at a selected field frquency, a control circuit for dynamically controlling the convergence of the cathode ray beams including in combination, convergence coil means disposed adjacent the cathode ray tube, a first source of dynamic convergence signals of substantially parabolic form and of the line frequency, said first source including series coupled capacitor means and inductor means connected to the line sweep system, a second source of signals of field frequency coupled to the field sweep system and including output means having low impedance at the line frequency, and means coupling said output means and said inductor means in a series circuit with said convergence coil means to apply dynamic convergence signals from said first and second sources to said convergence coil means.

8. In a television receiver including a cathode ray image reproducing tube having means for developing a plurality of cathode beams and scanning means including a line sweep system for deflecting the beams at a selected line frequency and a field sweep system for deflecting the beams at a selected field frequency, a control circuit for dynamically controlling the convergence of the cathode ray beams including in combination, convergence coil means disposed adjacent the cathode ray tube, a first source of dynamic convergence signals at the line frequency including series coupled capacitor and variable inductor elements connected to the line sweep system and tuned substantially to the line frequency, a second source of dynamic convergence signals of field frequency coupled to the field sweep system and including output means having low impedance at the line frequency, and means including parallel connected resistor-capacitor means coupling said variable inductor element and said output means in series with said convergence coil means to apply line and field dynamic convergence signals to said convergence coil means, with said resistor-capacitor means by-passing line convergence signals and regulating the amplitude of field convergence signals, and said variable inductor element providing phase variation of the line convergence signals.

9. In a television receiver including a cathode ray image reproducing tube having means for developing a plurality of cathode ray beams and scanning means including a line sweep system for deflecting the beams at a selected line frequency and a field sweep system for deflecting the beams at a selected field frequency, a control circuit for dynamically controlling the convergence of a cathode ray beam including in combination, a convergence coil disposed adjacent the cathode ray tube, a first source of dynamic convergence signals at the line frequency including capacitor means and inductor means series coupled to the line sweep system and resonant substantially at the line frequency to provide line convergence signals of substantially parabolic form, said inductor means having relatively low impedance at the field frequency, a second source of dynamic convergence signals coupled to the field sweep system to provide field convergence signals of substantially parabolic form, said second source including impedance means having shunt capacity which presents relatively low impedance at the line frequency, and means coupling said impedance means and said inductor means in a series circuit with said convergence coil to apply line dynamic convergence signals to said convergence coil means through said impedance means, and to apply dynamic field convergence signals to said convergence coil means through said inductor means.

10. In a beam convergence circuit arrangement for a multi-beam kinescope the electron beams of which are deflected in two directions normal with respect to each other, circuitry for converging the beams in response to deflection in one direction and other circuitry for converging the beams in response to deflection in the other direction, said other circuitry comprising an adjustably tapped resistance element, means to apply a potential related to a point of reference potential and varying as a function of deflection in said other direction across said resistance element, a capacitor coupling one terminal of a convergence system winding to the tap of said resistance element, means connecting the other terminal of said convergence system winding to said point of reference potential, and an adjustable inductor having one terminal connected to said point of reference potential and another terminal connected to the junction between said capacitor and said convergence system winding, said capacitor and said adjustable inductor being adjustable to series resonance at a frequency corresponding to deflection in said other direction, to cause a sinusoidal wave of said last-named frequency to flow through said convergence system winding.

11. In a television receiver including a cathode ray image reproducing tube having means for developing a plurality of cathode ray beams, and scanning means including a line sweep system for deflecting the beams at a selected line frequency and a field sweep system for deflecting the beams at a selected field frequency, a control circuit for dynamically controlling the convergence of the cathode ray beams including in combination, convergence coil means adapted to be disposed adjacent the cathode ray tube for developing a field to converge a beam, first means providing dynamic convergence signals of line frequency and including a conducting path for signals of field frequency, said first means being coupled to the line sweep system and controlled thereby, second means providing dynamic convergence signals of field frequency and including a conducting path for signals of line frequency, said second means being coupled to the field sweep system and controlled thereby, and circuit means coupling said convergence coil means in a series circuit with said first and second means, so that said first means applies convergence signals of line frequency to said convergence coil means and through said conducting path of said second means, and said second means applies convergence signals of field frequency to said convergence coil means and through said conducting path of said first means.

12. In a television receiver including a cathode ray image reproducing tube having means for developing a plurality of cathode ray beams therein and a sweep system for supplying to the cathode ray tube a deflection signal of a selected frequency for scanning the cathode ray beams, a circuit for developing a convergence control signal for dynamically controlling the convergence of a cathode ray beam with respect to another beam throughout each cycle of the deflection signal, said circuit including in combination a series connected network of capacitor and inductor elements providing resonant gain at the selected frequency, means coupling said capacitor element to the sweep system so that said network develops a convergence control signal of the selected frequency and of increased amplitude due to the resonant effect of said network, a dynamic convergence coil adapted to be disposed adjacent the cathode ray tube for providing a convergence field therein, and means directly coupling said convergence coil to a point intermediate one of said capacitor elements and one of said inductor elements so that said control signal is applied to said dynamic convergence coil for converging a cathode ray beam with respect to another beam.

13. In a television receiver including a cathode ray image reproducing tube having means for developing a plurality of cathode ray beam components therein and a sweep system for scanning the cathode ray beam components and which sweep system includes a horizontal output transformer having a winding portion providing pulses at the line scanning frequency, a circuit for developing a convergence control for dynamically controlling the convergence of a cathode ray beam component, said circuit including in combination, a series connected network of capacitor and inductor elements series resonant at a frequency of the order of the line scanning frequency to provide resonant gain at such frequency, means coupling said network across the winding portion for energizing the same to produce a convergence control signal across one of said elements, dynamic convergence coil means adapted to be disposed adjacent a pre-deflection path of a cathode ray beam component to provide a magnetic field across such path, and means coupling said convergence coil means across said one element for applying the control signal to said convergence coil means, said convergence coil means having an impedance substantially greater than that of said one element for minimizing the effect thereof on said network.

14. In a television receiver including a cathode ray image reproducing tube having means for developing a plurality of cathode ray beam components therein and a sweep system for scanning the cathode ray beam components and which sweep system includes a horizontal output transformer having a winding portion providing pulses at the line scanning frequency, a circuit for developing a convergence control for dynamically controlling the convergence of a cathode ray beam component, said circuit including in combination, a series connected network of capacitor and inductor elements tuned to provide resonant gain at the line scanning frequency, means coupling said network across the winding portion for energizing the same to produce a convergence control signal across one of said elements, dynamic convergence coil means adapted to be disposed adjacent a pre-deflection path of a cathode ray beam component to provide a magnetic field across such path, and means coupling said convergence coil means across said one element for applying the control signal to said convergence coil means, said network being single-tuned and forming the sole tuned means supplying signals to said convergence coil means.

15. In a television receiver including a cathode ray image reproducing tube having means for developing a plurality of cathode ray beam components therein and a sweep system for scanning the cathode ray beam components and which sweep system includes a horizontal output transformer having a transformer winding with a portion connected to a reference point and a further portion at which appears pulses at the line scanning frequency, a circuit for developing a convergence control for dynamically controlling the convergence of a cathode ray beam component, said circuit including in combination, a series connected network of capacitor and inductor elements providing series resonance action, means coupling said network between the reference point and the further portion of the transformer winding to produce a control signal of the line scanning frequency and of increased amplitude due to the resonant effect of said network at a junction of said capacitor and inductor elements, a dynamic convergence coil adapted to be disposed adjacent a pre-deflection path of a cathode ray beam component to provide a magnetic field across such path, and means coupling said convergence coil to the reference point and directly to an interconnection of said elements for applying the control signal to said convergence coil.

16. In a television receiver including a cathode ray image reproducing tube having means for developing a plurality of cathode ray beam components therein and a scanning system including a line sweep system for deflecting the beam components at a selected line frequency and a field sweep system for deflecting the beam components at a selected field frequency, a control circuit for dynamically controlling the convergence of the cathode ray beam components including in combination, convergence coil means adapted to be disposed adjacent the pre-deflection path of a beam component in the cathode ray tube to provide a magnetic field across such path, said convergence coil means having a pair of terminals for electrical connection thereto, a series-resonant network coupled to the line sweep system, said series-resonant network including interconnected capacitor and inductor means to provide a resonant gain at the line frequency for developing a convergence signal of line frequency at an interconnection of said capacitor and inductor means, means coupling one terminal of said convergency coil means directly to the interconnection of said capacitor and inductor means for applying the convergence signal thereto, circuit means coupled to said field sweep system for developing a control signal at the field frequency, and means coupling said circuit means to the other terminal of said convergence coil means for applying said control signal thereto.

References Cited in the file of this patent

UNITED STATES PATENTS

| | | |
|---|---|---|
| 2,672,574 | Evans | Mar. 16, 1954 |
| 2,678,405 | Goodrich | May 11, 1954 |
| 2,707,248 | Goodrich | Apr. 26, 1955 |